(12) United States Patent
Wissman et al.

(10) Patent No.: US 11,728,973 B2
(45) Date of Patent: Aug. 15, 2023

(54) SYSTEM AND METHOD FOR SECURE ACCESS MANAGEMENT

(71) Applicant: ROYAL BANK OF CANADA, Toronto (CA)

(72) Inventors: Brandon Wissman, Toronto (CA); Thomas Jansz, Toronto (CA); Zoe McLennan, Toronto (CA); Lilly Deng, Toronto (CA); Dmitri Ivtchenko, Toronto (CA)

(73) Assignee: Royal Bank of Canada, Toronto (CA)

( * ) Notice: Subject to any disclaimer, the term of this patent is extended or adjusted under 35 U.S.C. 154(b) by 0 days.

(21) Appl. No.: 16/993,784

(22) Filed: Aug. 14, 2020

(65) Prior Publication Data

US 2021/0051004 A1 Feb. 18, 2021

Related U.S. Application Data (60) Provisional application No. 62/886,515, filed on Aug. 14, 2019.

(51) Int. Cl.
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/0894* (2013.01); *H04L 9/3213* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 7,222,233 B1* | 5/2007 | Rubin | ................... | H04L 9/3242 713/168 |
| 7,571,467 B1* | 8/2009 | Priestley | ............... | H04L 9/3263 709/200 |
| 9,178,876 B1* | 11/2015 | Johansson | ............... | G06F 21/00 |
| 9,225,704 B1* | 12/2015 | Johansson | ............... | H04L 63/08 |
| 9,967,236 B1* | 5/2018 | Ashley | ................. | H04L 63/083 |
| 10,565,531 B1* | 2/2020 | Heller | ...................... | G07C 9/21 |
| 10,692,078 B1* | 6/2020 | Kuo | ....................... | G06Q 20/385 |
| 2011/0277019 A1* | 11/2011 | Pritchard, Jr. | ........ | H04L 63/083 726/4 |
| 2012/0110330 A1* | 5/2012 | Dickgiesser | .......... | H04L 9/3271 713/168 |
| 2013/0205360 A1* | 8/2013 | Novak | ................... | H04L 63/102 726/1 |
| 2016/0006712 A1* | 1/2016 | Sade | ...................... | G06Q 10/06 726/5 |
| 2016/0094961 A1* | 3/2016 | Agrawal | ................ | H04L 51/30 455/466 |
| 2016/0119348 A1* | 4/2016 | Kus | ......................... | H04L 63/06 726/1 |

(Continued)

*Primary Examiner* — Bassam A Noaman
(74) *Attorney, Agent, or Firm* — Norton Rose Fulbright Canada LLP (57) ABSTRACT

An access management system and method provisions credentials to access a resource, such as external web user accounts. Credentials are generated, encrypted and stored. To access the resource, encrypted credentials are decrypted, masked, and served to users, such that they are not visible to the user requiring access. The user is unaware of the credentials used to authenticate and unable to access the provisioned web resources outside set parameters.

20 Claims, 9 Drawing Sheets

(56) References Cited

U.S. PATENT DOCUMENTS

| | | | |
|---|---|---|---|
| 2016/0212132 A1* | 7/2016 | Banerjee | H04L 67/2814 |
| 2016/0262021 A1* | 9/2016 | Lee | H04L 63/0807 |
| 2018/0176771 A1* | 6/2018 | Yang | H04L 9/0819 |
| 2018/0262471 A1* | 9/2018 | Pereira | G06Q 20/20 |
| 2019/0238535 A1* | 8/2019 | Lew | G10L 17/24 |
| 2019/0349360 A1* | 11/2019 | Yeddula | H04L 63/0807 |
| 2020/0076792 A1* | 3/2020 | Ray | H04L 63/083 |

* cited by examiner

SYSTEM AND METHOD FOR SECURE ACCESS MANAGEMENT

CROSS-REFERENCE TO RELATED APPLICATION(S)

This application claims priority from U.S. Provisional Patent Application No. 62/886,515, filed on Aug. 14, 2019, the entire contents of which are incorporated by reference herein.

FIELD

This relates to access management, in particular management of the authentication, authorization and audit of access to resources such as third-party externally-hosted applications.

BACKGROUND

In the context of an enterprise or organization's internal network, or intranet, existing access management tools, such as password managers, may be used to manage credentials for a user to access resources such as third-party applications or services on an external network. However, such credential data may not be stored or transmitted securely, and can be owned or exposed by another party, such as the vendor of the access management tool or their partners or contractors.

Credentials for such third-party applications or services may be set by a user or be visible to them, and thus vulnerable to being lost, shared with others, as well as susceptible to the insider threats and to social engineering attacks. Users may be tempted to re-use personal accounts or their existing enterprise passwords, for example. Such enterprise users logging onto third-party applications using personal accounts may create a security risk, as using a personal account could allow that user to continue to access the service outside the organization, and/or information could be undesirably shared or exposed. On the other hand, users may decide to re-use enterprise credentials by entering the same username and password, as credentials for the third-party application or service—thus exposing those credentials (already used elsewhere in the enterprise) to a third-party or a malicious actor, which may facilitate unauthorized access to enterprise services and data and could result in a breach.

As such, there is generally a lack of secure access management and activity logging of the use of external resources within an organization.

SUMMARY

According to an aspect, there is provided a computer-implemented method for provisioning credentials, the method comprising: automatically detecting an attempt by a user to access an external network resource; determining whether the resource requires credentials for access; determining whether credentials have been previously generated for the user and the resource; when the resource requires credentials for access and credentials have not previously been generated: generating credentials based at least in part on an entropy target and an identity of the user; requesting, over a network, a public cryptographic key from a key server; receiving, over the network, the public cryptographic key from the key server; encrypting the credentials using the public cryptographic key; and storing the encrypted credentials in a memory.

In some embodiments, the method further comprises: identifying a private cryptographic key corresponding to the public cryptographic key; decrypting the encrypted credentials using the private cryptographic key; and inserting the decrypted credentials in a web form to access the resource.

In some embodiments, the method further comprises masking the decrypted credentials before the inserting the decrypted credentials.

In some embodiments, the method further comprises requesting real-time approval before generating the credentials.

In some embodiments, the automatically detecting the attempt comprises automatically detecting a universal resource locator (URL) of the resource.

In some embodiments, the determining whether the resource requires credentials for access comprises determining whether the resource is identified in a catalogue.

In some embodiments, the determining whether credentials have been previously generated for the user and the resource comprises determining whether credentials for the user and the resource are present in the database.

In some embodiments, the credentials are generated based at least in part on a cryptographically secure random number generator.

In some embodiments, the credentials are generated based at least in part on user input from the user.

In some embodiments, the credentials are generated based at least in part on user input from an administrator.

According to another aspect, there is provided a computer system comprising: a processor; a memory in communication with the processor, the memory storing instructions that, when executed by the processor cause the processor to: automatically detect an attempt by a user to access an external network resource; determine whether the resource requires credentials for access; determine whether credentials have been previously generated for the user and the resource; when the resource requires credentials for access and credentials have not previously been generated: generate credentials based at least in part on an entropy target and an identity of the user; request, over a network, a public cryptographic key from a key server; receive, over the network, the public cryptographic key from the key server; encrypt the credentials using the public cryptographic key; and store the encrypted credentials in the memory.

In some embodiments, the memory further stores instructions that, when executed by the processor cause the processor to: identify a private cryptographic key corresponding to the public cryptographic key; decrypt the encrypted credentials using the private cryptographic key; and insert the decrypted credentials in a web form to access the resource.

In some embodiments, the memory further stores instructions that, when executed by the processor cause the processor to: mask the decrypted credentials before the inserting the decrypted credentials.

In some embodiments, the memory further stores instructions that, when executed by the processor cause the processor to: request real-time approval before generating the credentials.

In some embodiments, the attempt is automatically detected by automatically detecting a universal resource locator (URL) of the resource.

In some embodiments, the resource is determined as requiring credentials for access by determining whether the resource is identified in a catalogue.

In some embodiments, the credentials are determined as having been previously generated for the user and the resource by determining whether credentials for the user and the resource are present in the database.

In some embodiments, the credentials are generated based at least in part on a cryptographically secure random number generator.

In some embodiments, the credentials are generated based at least in part on user input from the user.

According to a further aspect, there is provided a non-transitory computer readable medium comprising a computer readable memory storing computer executable instructions thereon that when executed by a computer cause the computer to perform a method as disclosed herein.

Other features will become apparent from the drawings in conjunction with the following description.

BRIEF DESCRIPTION OF DRAWINGS

In the figures which illustrate example embodiments.

DETAILED DESCRIPTION

The following disclosure describes systems and methods for account management providing account provisioning tools that may allow a credential or credentials, such as a username and a password, not be set by a user and not be visible to the user. The provisioning of credentials, namely generation and delivering of credentials, for a user may be automatic and encrypted.

In contrast to existing password managers, as will become apparent, credentials are set and managed by systems and methods disclosed herein. Users or end-users, such as employees, and management team members may be both unaware of the credentials at all times. Neither party may have any control over the credentials.

Thus, it may be possible to quickly achieve an improvement to an overall account security posture of an enterprise or organization by adding an overlay of the enterprise-level secure credentials lifecycle management, and the visibility of the credentials use, exceptions and trends, without necessarily going to an external vendor.

Systems and methods disclosed herein provide the capability to control access to various resources. Access control is enabled through authentication management, audit capabilities and single sign-on functionality. Systems and methods disclosed herein may be able to perform access control functions without external vendor cooperation.

Thus, provisioning of credentials as disclosed herein may also help manage and mitigate the risk of resource access, such as browser based third party application usage, within an organization.

Aspects of various embodiments are described through reference to the drawings.

Figure 1:
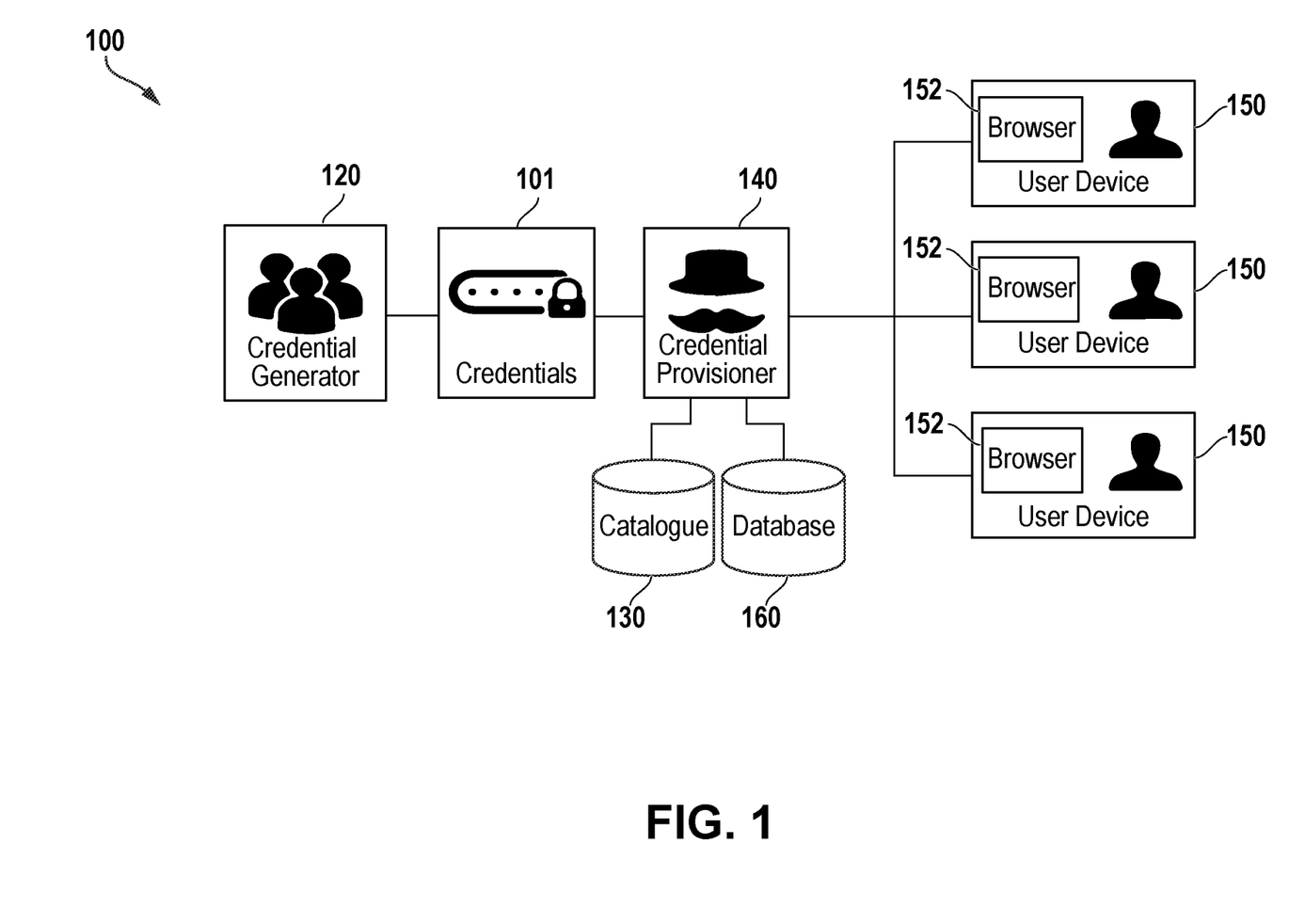
FIG. 1 is a simplified schematic diagram of an access management system, according embodiment.

FIG. 1 illustrates an embodiment of an access management system 100 for provisioning credentials to access resources 103 such as third-party applications or services. Access management system 100 may be implemented within an organization or enterprise's internal network, or elsewhere in the network path of enterprise end-user traffic to resources 103.

Access management system 100 includes a credential generator 120, a credential provisioner 140, a catalogue 130, a database 160, and one or more user devices 150 associated with users such as enterprise end-users.

Components of access management system 100, including one or more of credential generator 120, credential provisioner 140, catalogue 130, and user devices 150, may be in communication with each other as well as external networks and resources 103 by way of a suitable network, for example, a packet-switched network, in the form of a local area network (LAN), a wide area network (WAN), the public Internet, a virtual private network (VPN) or the like.

In some embodiments, components of access management system 100 may be web-accessible or web-based, and may be accessed by a suitable web browser.

A global enterprise authentication system or authority, such as PingFederate™, may provide single sign-on functionality and be used to identify and authenticate a user within an organization's network, for access to systems and methods and disclosed herein, and in an example, integrated with access management system 100.

Credential generator 120 can be configured to generate credentials 101 for a resource 103, and credentials 101 are served to user devices 150 via credential provisioner 140. Credential generator 120 can be one or more administrator or privileged access workstations, with increased security features such as being limited to administrative or privileged account user access and having restricted or compartmentalized access to non-administrative use such as email or web browsing, or other suitable workstation.

Generation of credentials 101 by credential generator 120 can be automated, and may have a certain entropy target for the entropy of the sequence of bits in credentials 101, and may be based at least in part on an enterprise identity of the user. In an example, a hardware random number generator and/or a cryptographically secure random or pseudorandom number generator may be used to achieve characteristics defined by enterprise policies or standards. An entropy target, or complexity or randomness target, may be selected or mandated by the enterprise.

User input, such as from an end-user and/or administrator, can provide additional randomness input into the credential generation process by supplying random data such as mouse movement or audio clips, to be used as an additional entropy source for generation of credentials 101.

In some embodiments, credential generator 120 is configured to create or generate a tokenized or random email address for the user as part of credentials 101, so that the user's actual organization email address is not used for credentials 101.

In some embodiments, a provisioning team, such as an administrative team, at credential generator 120 generates credentials 101 for a user for a resource 103.

In an example, an administrative dashboard may be hosted on credential generator 120, and configured to allow an administrator to provision credentials 101 for a user (for example, via an admin mode of credential provisioner 140) and the ability to adjust policies for each user identity. The dashboard can also display views of various logs that may be required for an audit of a user. Data analytics in the form of graphs and other visual components may be displayed in the administrative dashboard.

Credentials 101 can be in part associated with an identity of a device such as user device 150 and a user, such as an email address. Credentials 101 are used to establish the identity of a user and control the user's access to resources 103 or other information. Credentials 101 can be used to provide authorization to log in to a resource 103 or be a component of a user account associated with a resource 103.

In some embodiments, credentials 101 include a combination of a username and a password. Other suitable credentials are contemplated, such as any memorized secret (e.g., passcode, passphrase, PIN or a shared secret, etc.), a digital certificate or another cryptographic element such as a secret key, digital signature, hash, fingerprint or the like.

In some embodiments, credentials 101 may be associated with a particular or individual user. In other embodiments, credentials 101 may be associated with a group of users (for example, a team or business unit), or in other embodiments be user agnostic, for example, applicable for any user across an organization.

While the term "credentials" is used herein in the plural form, it is understood that "credential" and "credentials" can be used interchangeably and refer to both a single element, such as a certificate, or multiple elements, such as a username and a password.

Resources 103 accessed using provisioned credentials 101 can include internal resources or applications within an organization, such as within organization's internal network, or external resources such as web resources or third-party applications or services on an external network, such as outside an enterprise or organization's controlled environment, and accessed, for example, on the World Wide Web by way of a suitable web browser.

Third-party applications can include externally-hosted applications, such as external web resources which may be web-based and accessed for example, by way of web form. In an example, third-party applications may include productivity or file sharing apps such as Dropbox™, Google Drive™, Survey Monkey™, Google Analytics™, Trello™, and the like.

A list of resources 103 can be stored in a data store such as catalogue 130, containing information related to whether or not a particular resource 103 requires provisioned credentials, and whether or not credentials 101 have been previously generated for that resource 103 and for a particular user.

Figure 2:
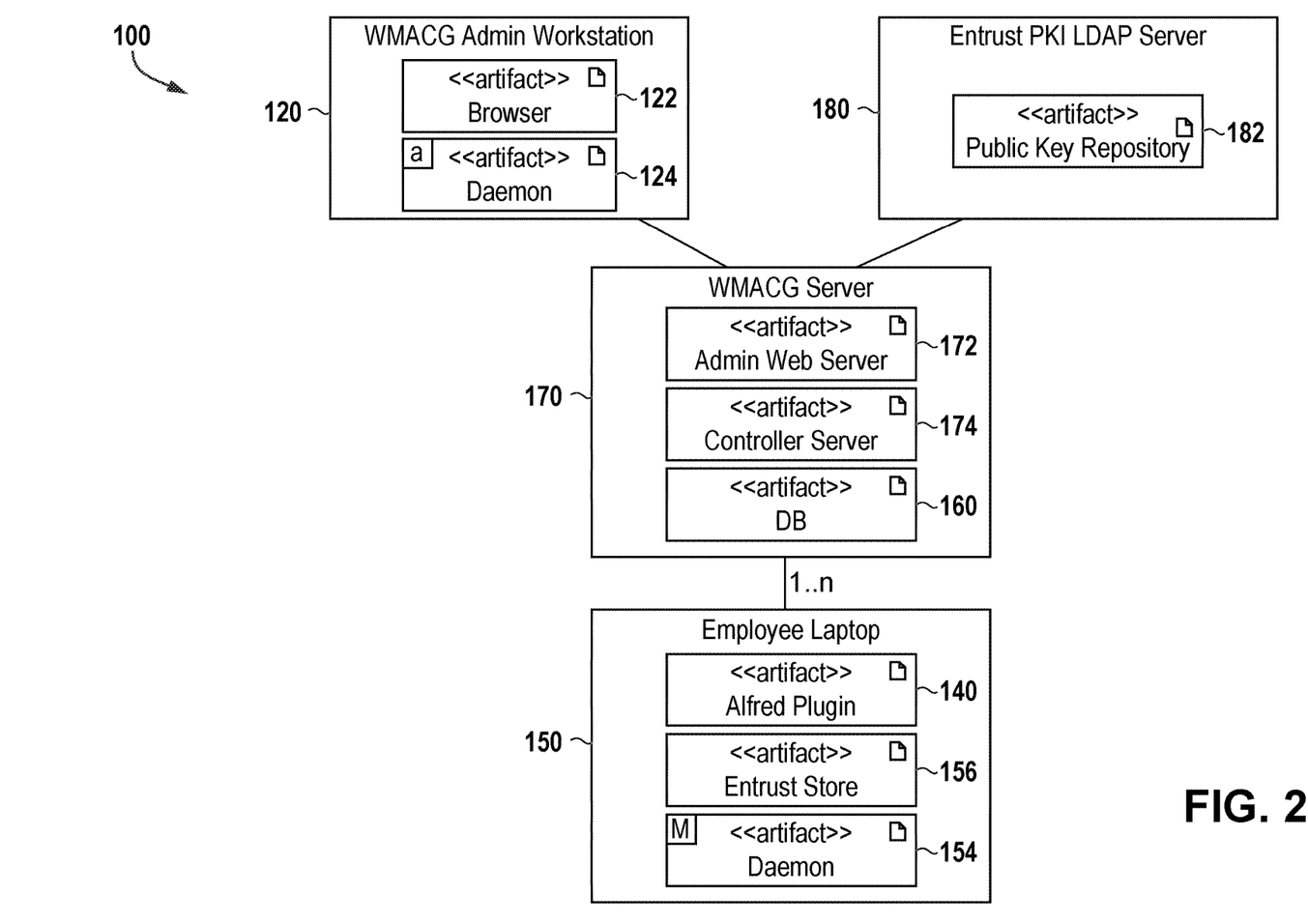
FIG. 2 is a deployment diagram illustrating execution architecture of an access management system, according embodiment.

In some embodiments, credential provisioner 140 is configured to provision credentials 101 from credential generator 120, accessed, in some examples, by way of a central server such as central server 170 (as shown in FIG. 2), to access resources 103. From there, credentials 101 can be served to user device 150, such that they are masked from the user requiring access. Therefore, the user may be unaware of specific credentials, such as credentials 101 generated by credential generator 120, used to authenticate and the user is thus unable to access the provisioned resources 103 outside the parameters set by access management system 100.

In some embodiments, credential provisioner 140 is also able to block access to certain resources 103 such as websites within a browser such as browser 152 on user device 150 and provide other auditing capabilities such as, but not limited to, determining the last login time of a user, identifying attempts to gain access to protected resources, and logging any administrative actions. Credential provisioner 140 may contain an admin mode, available to administrators only.

In some embodiments, credential provisioner 140 provides for the initiation of the generation of credentials 101 by credential generator 120 and delivery or insertion of the resulting provisioned credentials 101 in a suitable format for resource 103, such as insertion into a web form during external web account provisioning. Generation of credentials 101 is described in an embodiment in further detail below, with reference to the sequence diagram of FIG. 5. Delivery of credentials 101 is described in an embodiment in further detail below, with reference to the sequence diagram of FIG. 6.

Credential provisioner 140 can be implemented on user device(s) 150, as shown by way of example in FIG. 2, or on another suitable computing device within access management system 100.

In some embodiments, credential provisioner 140 can be implemented as a browser plugin, such as a plugin for a browser 152 on user device 150. As a browser plugin, credential provisioner 140 can be implemented as an executable software module for customizing a web browser such as Google Chrome™. Credential provisioner 140 may suitably modify a web browser to perform functionality as disclosed herein, since a resource 103 such as a third party application or website may be accessed by way of a web browser, and a web browser is used to populate credentials in a form to access the resource.

In some embodiments, credential provisioner 140 can be implemented as a browser extension, such as an extension to browser 152 on user device 150, as source code to modify a web browser such as Google Chrome.

In some embodiments, credential provisioner 140 can be implemented as an executable binary file, such as on user device 150.

In some embodiments, credential provisioner 140 can be implemented in hardware and/or software or using virtualization and/or containerization.

Credential provisioner 140 may be in communication with catalogue 130, a suitable data store that stores information that identifies resources for which credentials 101 are to be provisioned by credential provisioner 140.

Catalogue 130 maintains a list of resources 103, and may be updated by credential provisioner 140 to add or remove applications for which credentials 101 are to be provisioned, based on, for example, the suitability of access for users to a resource 103 that requires credentials such as dictated by an enterprise policy as to whether access to a resource requiring credentials should be granted.

Credential provisioner 140 may also be in communication with database 160. Database 160 is a suitable data store to store credential information such as credentials 101.

In some embodiments, credentials 101 may be encrypted, as disclosed herein, and encrypted credentials 101 stored in database 160.

As shown in FIG. 2, database 160 may be implemented at a central server 170, as described in further detail below.

Access management system 100 also includes one or more user devices 150, that can be connected within an organization's internal network and for use by an associated user or end-user such as an employee of an enterprise or organization.

FIG. 2 is a deployment diagram illustrating an example execution architecture of access management system 100. FIG. 2 illustrates hardware and software elements of access management system 100, including credential generator 120

(illustrated by way of example in FIG. 2 as "WMACG (Wealth Management Access Control Group or Access Control Group) Admin Workstation"), a key server 180 (illustrated by way of example in FIG. 2 as "Entrust PKI (Public Key Infrastructure) LDAP (Lightweight Directory Access Protocol) Server"), a central server 170 (illustrated by way of example in FIG. 2 as "WMACG Server") and a user device 150 (illustrated by way of example in FIG. 2 as "Employee Laptop"), which may be in communication by way of a suitable network.

Credential generator 120, user device 150, central server 170, and key server 180 are shown in FIG. 2 as nodes, represented as cubes. The nodes of FIG. 2 can be physical hardware or logical entity (such as software) that executes one or more components, subsystems or executables.

Lines between credential generator 120, key server 180, central server 170, and user device 150 in FIG. 2 illustrate paths of communication between nodes and may be in communication by way of a suitable network. A number from 1 to n communication links may be linked between central server 170 and 1 to n user devices 150.

As illustrated in FIG. 2, "artifacts" are elements caused by a development process of access management system 100 and deployed on nodes. The artifacts may be example software components and data stored within memory of one or more computing devices.

As shown in FIG. 2, credential generator 120, user device 150 and key server 180 may be centrally connected by way of central server 170.

Central server 170, in an example, "WMACG Server" as shown in FIG. 2, hosts and serves the following: credentials 101 (used for authentication to external web resources), identity/policy authorization information for individuals and web connector templates data. Web connector templates can contain predefined configuration data and rules for a web connector to perform its function, such as identifying what type of data to inject in which fields in a web form at a resource 103, for example.

Central server 170 may include an access interface 172, illustrated by way of example as "Admin Web server" in FIG. 2. Access interface 172 can be a user interface to access and manage central server 170, and may be accessed, for example, using browser 122 at credential generator 120.

In some embodiments, central server 170 includes a controller 174, illustrated by way of example as "Controller/Server" in FIG. 2, to monitor the state of central server 170. Controller 174 can be configured to define and monitor parameters of central server 170, including parameters that are deemed critical to the operation of the server 170, such as the functionality it provides or its availability, as an example.

In some embodiments, central server 170 includes database 160, illustrated by way of example as "DB" in FIG. 2, for storing encrypted credentials 101.

Credential provisioner 140 is illustrated by way of example as "Alfred Plugin" in FIG. 2 and hosted on user device 150, and in communication with central server 170. Credential provisioner 140 can receive credentials 101 from credential generator 120 and, using a web connector template from central server 170, inject credentials 101 into a resource 103 such as an externally hosted web form—masking credentials 101 from the user utilizing resource 103.

In some embodiments, credential generator 120 includes a suitable browser 122, such as Google Chrome, and an encryption/communication daemon 124 as a deployment option and to facilitate the functions of credentials generator 120.

Encryption can be performed by access management system 100 to protect the confidentiality and integrity of credentials 101, in storage and in transit, as a security control. An encryption daemon 154 can be implemented as a service on user device 150, the local machine of the user endpoint.

Encryption and decryption may be performed utilizing public-key (or asymmetric) cryptography. In asymmetric cryptography, data, for example, a message from a sender or credentials 101, can be encrypted using a public cryptographic key, for example, the recipient's public key. An encrypted message can only be decrypted with a corresponding private cryptographic key, for example, the recipient's private key. Public and private keys can be generated and otherwise managed by an enterprise public key infrastructure ("PKI") system (e.g., Entrust™).

Encryption daemon 154 may be invisible to the user and decrypt and encrypt strings, such as credentials 101, using public and private keys, on the user's local machine, for example, user device 150. Public and private keys may be managed and distributed to a user as Entrust certificates.

User private keys are securely stored in a secure cryptographic store such as a private key store 156, illustrated by way of example as "Entrust Store" in FIG. 2. Private keys may be stored locally on user device 150 and suitably encrypted, such as by a passphrase. Private keys can be used to decrypt data, namely, encrypted credentials 101.

Public keys can be used to encrypt data such as credentials 101 to form encrypted credentials 101, stored in a public key repository 182 at key server 180, and made available to communication endpoints in access management system 100.

In some embodiments, access management system 100 generates a public key and a corresponding private key associated with a user.

Encryption daemon 154 can communicate with credential provisioner 140 (e.g., a browser extension) as a local web service hosted locally, for example, on user device 150. Encryption daemon 154 can utilize an organization's public key infrastructure ("PKI") (administered, in an example, by Entrust) so that an administrator does not have access to the private keys of users (for example, in private key store 156), but those private keys still exist within the scope of the organization by the virtue of an enterprise tool (such as Entrust) managing those keys. Therefore, private keys could be recovered through enterprise-approved investigative processes, whereby access to the private key material could still be granted to authorized investigators following a defined approval process.

An organization or enterprise public key infrastructure can thus be used to secure credentials 101 in transit and in storage, without either the user or administrators having access to user's credentials 101 for the provisioned resources 103, but with the possibility of a centralized enterprise key recovery to access the user's private key and hence credentials 101, if needed, such as for forensic or availability reasons.

In some embodiments, key server 180 includes a public key repository 182 to store public keys. A public key may be contained in a cryptographically protected identity certificate containing not only the key but also entity information about the owner of the key, such as the identity of a user.

Access management system 100 and components thereof, such as admin workstation 120, user device 150, central server 170, and key server 180, may be implemented as software and/or hardware, for example, in one or more computing devices 102.

Figure 3:
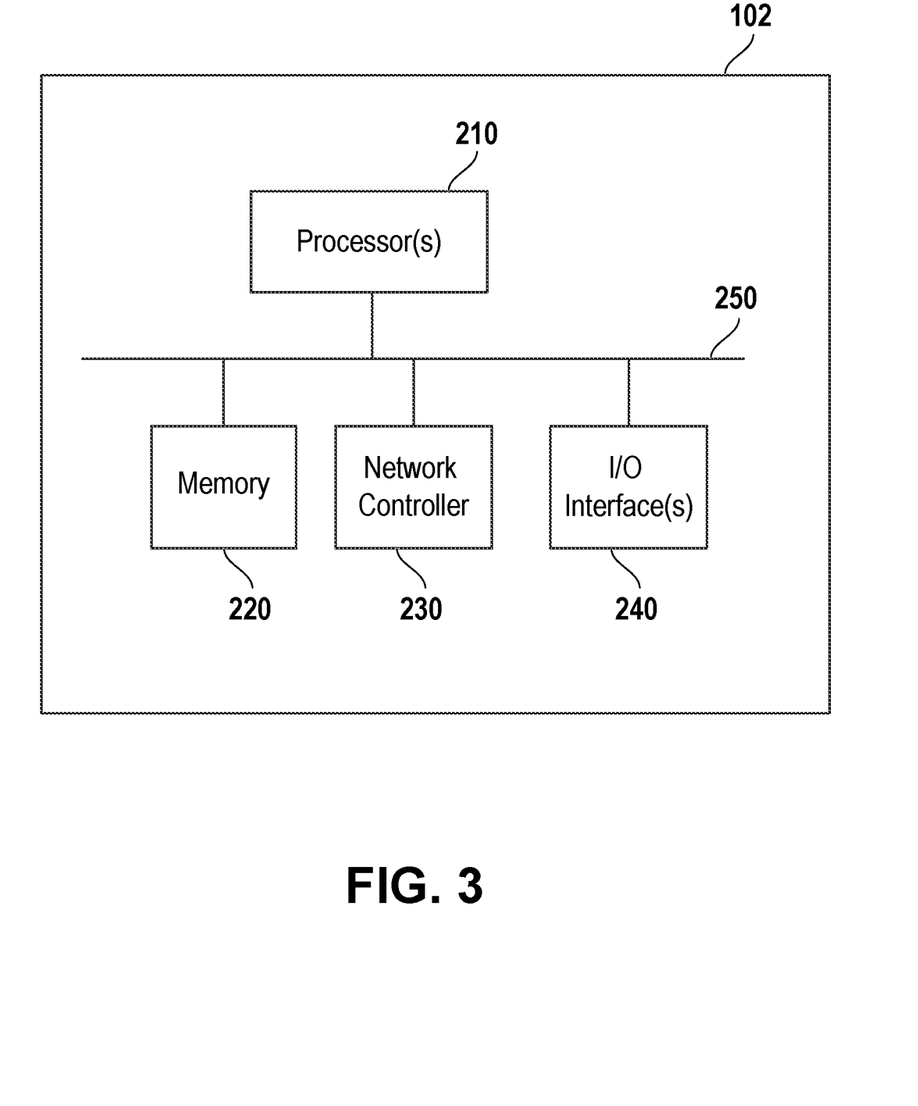
FIG. 3 is a block diagram of example hardware components of a computing device, according to an embodiment.

FIG. 3 is a high-level block diagram of an example computing device 102.

As illustrated, computing device 102 includes one or more processor(s) 210, memory 220, a network controller 230, and one or more I/O interfaces 240 in communication over bus 250.

Processor(s) 210 may be one or more Intel x86, Intel x64, AMD x86-64, PowerPC, ARM processors or the like.

Memory 220 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 230 serves as a communication device to interconnect the computing device with one or more computer networks such as, for example, a local area network (LAN) or the Internet.

One or more I/O interfaces 240 may serve to interconnect the computing device with peripheral devices, such as for example, keyboards, mice, video displays, and the like. Such peripheral devices may include a display of device 102. Optionally, network controller 230 may be accessed via the one or more I/O interfaces.

Software instructions are executed by processor(s) 210 from a computer-readable medium. For example, software may be loaded into random-access memory from persistent storage of memory 220 or from one or more devices via I/O interfaces 240 for execution by one or more processors 210. As another example, software may be loaded and executed by one or more processors 210 directly from read-only memory.

Figure 4A:
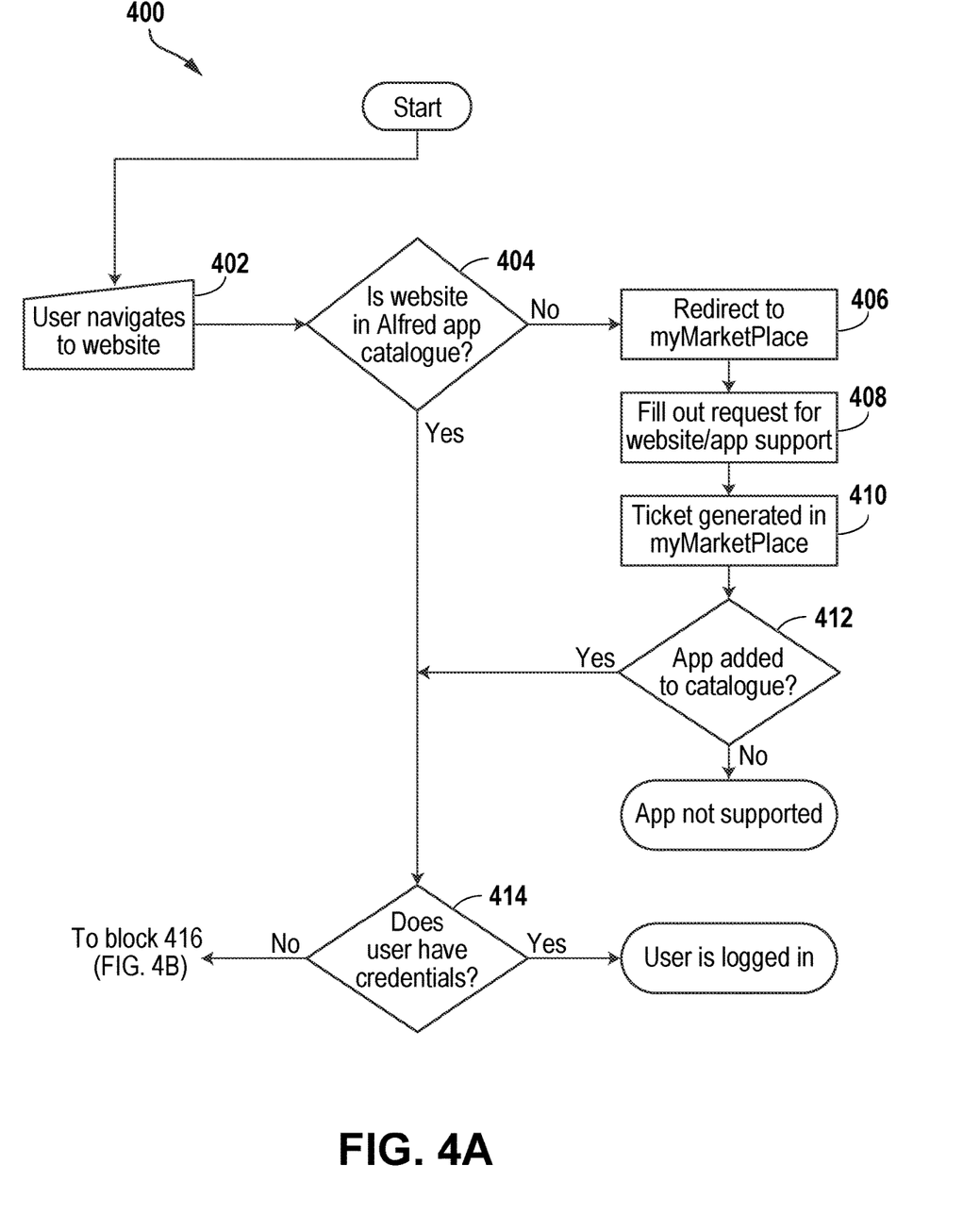
FIGS. 4A and 4B illustrate a flow chart of a method for provisioning credentials for a website, according to an embodiment.
Figure 4B:
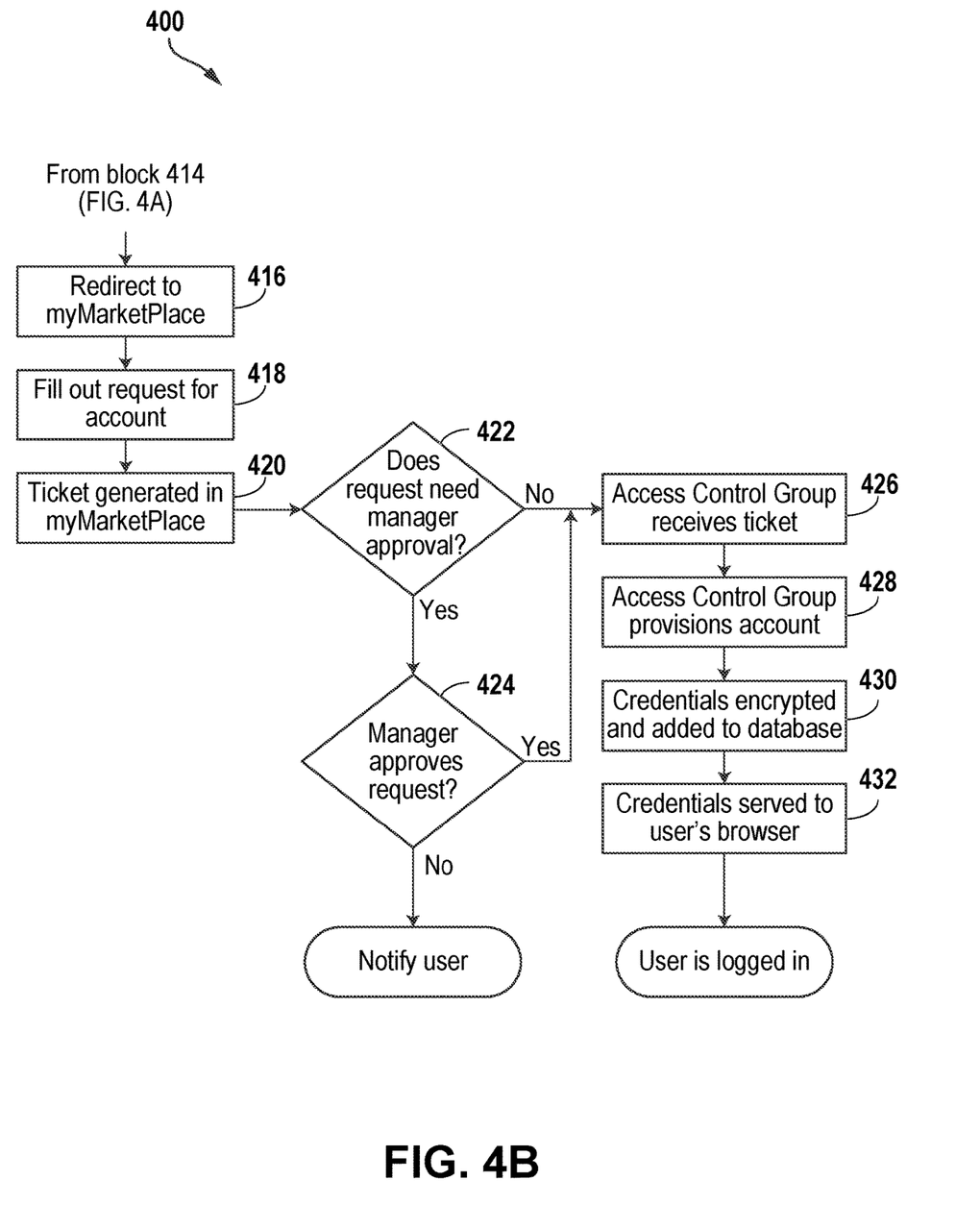

FIGS. 4A and 4B illustrate a flow chart of a method 400 for provisioning credentials for a website, in an example using access management system 100, according to an embodiment. Steps, shown as blocks in FIGS. 4A, 4B, are provided for illustrative purposes. Variations of the blocks, omission or substitution of various blocks, or additional blocks may be considered. It should be understood that one or more of the blocks may be performed in a different sequence or in an interleaved or iterative manner.

Method 400, in particular, one or more of blocks 402 to 432, may be performed by software and/or hardware of a computing device such as computing device 102. In some embodiments, one or more of blocks 402 to 432 may execute at runtime, providing for the provisioning of credentials at runtime, which may be in real-time or near real-time.

In some embodiments, an approval workflow for provisioning credentials utilizes an enterprise ticketing system and can be based on enterprise security policy.

At block 402, a user, such as an employee, navigates to a resource 103, such as a website, using user device 150. If accessing a third-party site that requires credentials, the site may get blocked or redirected and the user redirected to a form to request access.

At block 404, credential provisioner 140 evaluates whether the website is identified in catalogue 130 (illustrated by way of example in FIG. 4A as "Alfred app catalogue") as a resource 103 for which credential provisioner 140 provisions (i.e., generates and delivers) credentials 101. If the website is identified in catalogue 130 as a resource 103 for which credential provisioner 140 provisions credentials 101, control flow proceeds to block 414. If the website is not a resource 103 for which credential provisioner 140 provisions credentials 101, control flow proceeds to block 406.

At block 406, the user is redirected to an enterprise ticketing or workflow system (for example, "ServiceNow" or "myMarketPlace", as illustrated by way of example in FIG. 4A).

At block 408, the user is prompted to fill out a request to consider adding the target website to the list of supported applications (i.e., resources 103 in catalogue 130 as requiring provisioned credentials 101).

At block 410, a ticket is generated in "myMarketPlace" to request adding the website as a resource 103 to catalogue 130.

At block 412, credential provisioner 140 evaluates whether the website (or "App") is to be added as a resource 103 to catalogue 130. If the website or app is to be added, the website or app is added as a resource 103 to catalogue 130, and control flow proceeds to block 414. If the website is evaluated as not to be added, the website or app is not supported.

At block 414, credential provisioner 140 evaluates whether credentials 101 have previously been generated for resource 103, to determine whether the user already has suitable credentials 101, previously generated. If suitable credentials 101 for the user to access resource 103 have been previously generated, the credentials 101 are provided and the user is logged in to resource 103. If credentials 101 have not been previously generated, control flow proceeds to block 416, illustrated in FIG. 4B.

Turning to FIG. 4B, at block 416, the user is redirected to the enterprise ticketing/workflow system (e.g. "ServiceNow" or "myMarketplace").

At block 418, the user is prompted to fill out a request for "account", to generate credentials 101.

At block 420, a ticket is generated in the ticketing system to request generation of credentials 101 for resource 103, namely the website.

At block 422, credential generator 140 evaluates whether the request in the ticket needs manager approval. If the request needs manager approval, control flow proceeds to block 424. If the request does not need manager approval, control flow proceeds to block 426.

At block 424, credential generator 140 evaluates whether the manager approves the request, for example, by receiving a notification. If the request is not approved, the user is notified. If the request is approved, control flow proceeds to block 426.

By designating requests as requiring approval, it may be possible to detect an attempt to access resources 103 such as unknown third-party sites that require credentials, and a manager or automated process could grant or revoke credential access, or request that the unknown or new third-party application or service be considered to be added to the list of supported applications (resources 103 identified in catalogue 130).

In some embodiments, a real-time push notification can be implemented for approval flows. For example, a manager can have an option of "just in time" or run-time approval or denial of either access to resource 103 or provisioning of credentials 101 for resource 103. In an example, control flow can proceed from block 424 only after the manager explicitly acknowledges a push notification or message, such as on a mobile device local to the manager, for example, in real-time. Conveniently, this may help introduce an optional additional level of control to the security model, over and above any asynchronous approvals in the enterprise ticketing system.

At block 426, the ticket is received at credential generator 120, in an example, by a team or service such as an Access Control Group.

At block 428, credential generator 120 generates credentials 101, or an "account", as described in more detail with reference to FIG. 5.

In some embodiments, a form submission for the request goes to a team or service (such as the Access Control Group) responsible for managing sign-up and control for credentials 101 for resources 103. In an example, a credential 101 registration process may create or generate a tokenized or random email address for the user, so that the user's actual organization email address is not used for credentials 101.

At block 430, credentials 101 are encrypted. In some embodiments, credentials 101 may be linked with and encrypted with a user's public key from a key-management tool (such as Entrust) and automatically saved and stored in a database such as database 160 on central server 170, and served to credential provisioner 140, such as on user device 150.

Credential provisioner 140, in an example, a browser plug-in or extension, receives encrypted credentials 101 from central server 170, and encryption daemon 154 decrypts credentials 101 (for example, using the user's private key stored in private key store 156).

At block 432, credentials 101 are served to the user's browser, such as browser 152, and credential provisioner 140 then autofills credentials 101 for resource 103, for example, by automatically filing suitable fields with credentials 101.

In an example, credential provisioner 140 automatically populates the appropriate fields in a web form or facilitates a single-sign on process to resource 103.

In some embodiments, the user is unable to see the credentials 101 used to login, or copy credentials 101 for use outside of the organization or enterprise. The process of auto-filling credentials 101 can be completely removed and hidden from the user. In another example, credentials 101 can be shown via a visual representation of masking, such as with asterisks.

Each user may have access to various and different sets of enterprise-managed third-party service credentials 101. In some embodiments, there may be options for a possible sharing of credentials 101, or for a request to share access using a credential 101 of another user or employee.

Thus, access management system 100 can generate unique credentials 101 for a user and a resource 103, encrypt credentials 101 stored in a database 160 maintained by the organization, and use credentials 101 to register an account with resource 103.

Figure 5:
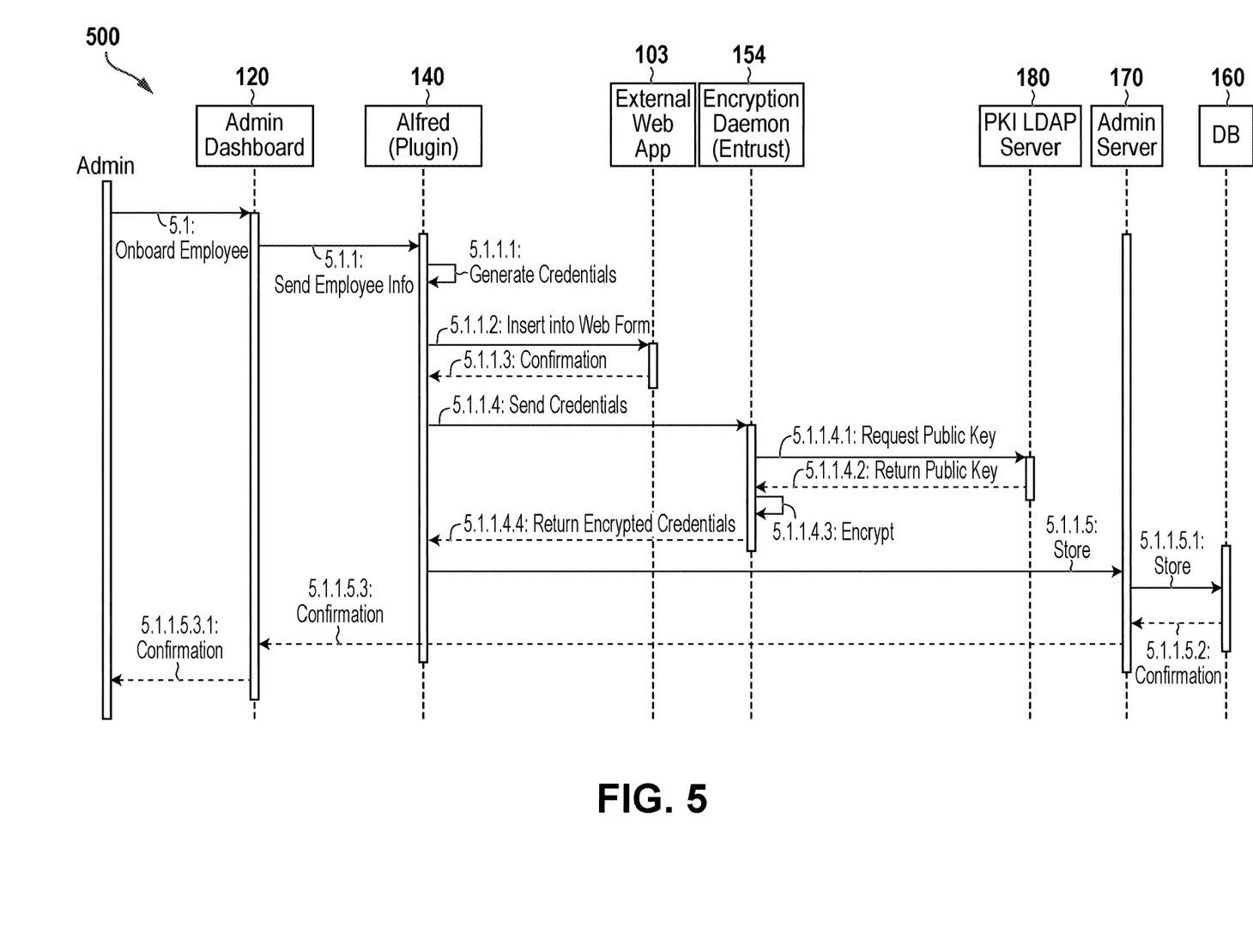
FIG. 5 is a credential generating sequence diagram, according to an embodiment.

FIG. 5 is a sequence diagram for a method 500 for generating credentials 101 (or a user account) performed by access management system 100, according to an embodiment. The steps of FIG. 5 may be performed by processor(s) 210 of a computing device 102 at one or more of credential generator 120, user device 150, central server 170, or key server 180.

Steps are provided for illustrative purposes. Variations of the steps, omission or substitution of various steps, or additional steps may be considered. It should be understood that one or more of the steps may be performed in a different sequence or in an interleaved or iterative manner.

At step 5.1, a sequence may be triggered by an administrator, illustrated in FIG. 5 as "Admin", sending a message to onboard a user, such as an employee, to credential generator 120, which can include an "Admin Dashboard", for access to a third-party application.

At step 5.1.1, employee information is sent from credential generator 120 to credential provisioner 140, illustrated by way of example as "Alfred (Plugin)" in FIG. 5.

At step 5.1.1.1, credentials 101 for the employee are generated. In an example, generation of credentials 101 can be performed by credential provisioner 140, using techniques as described herein. In another example, generation of credentials 101 can be performed by credential generator 120.

At step 5.1.1.2, the generated credentials 101 are inserted into a web form of resource 103 such as a third-party application (illustrated by way of example as "External Web App" in FIG. 5).

At step 5.1.1.3, confirmation of the credentials 101 is received at credential provisioner 140 from resource 103.

At step 5.1.1.4, credentials 101 are sent to encryption daemon 154, illustrated in FIG. 5 as "Encryption Daemon (Entrust)".

At step 5.1.1.4.1, encryption daemon 154 requests a public key from key server 180, illustrated by way of example as "PKI (Public Key Infrastructure) LDAP (Lightweight Directory Access Protocol) Server" in FIG. 5.

At step 5.1.1.4.2, a public key is returned from key server 180 to encryption daemon 154.

At step 5.1.1.4.3, encryption daemon 154 encrypts credentials 101 using the public key.

At step 5.1.1.4.4, encryption daemon 154 returns encrypted credentials 101 to credential provisioner 140.

At step 5.1.1.5, credential provisioner 140 sends encrypted credentials to 101 be stored at central server 170, illustrated by way of example as "Admin Server" in FIG. 5.

At step 5.1.1.5.1., central server 170 sends encrypted credentials 101 to be stored at database 160, illustrated by way of example as "DB" in FIG. 5.

At step 5.1.1.5.2, central server 170 receives confirmations from database 160 that encrypted credentials 101 are stored at database 160.

At step 5.1.1.5.3, credential generator 120 receives confirmation from central server 170, for example, of generation and storage of encrypted credentials 101.

At step 5.1.5.3.1, the administrator receives confirmation from credential generator 120 for example, of generation and storage of encrypted credentials 101.

Figure 6:
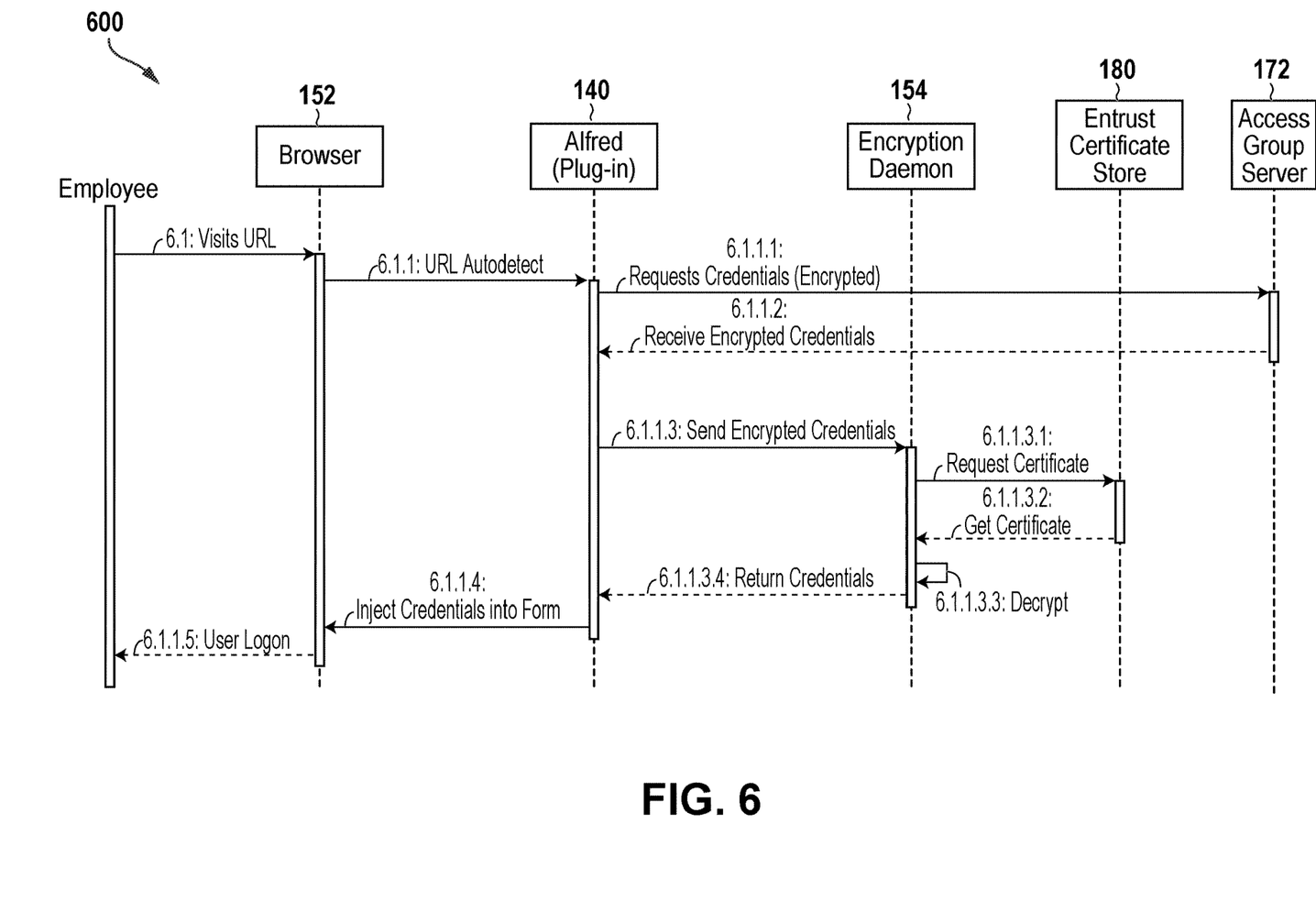
FIG. 6 is a credential delivery sequence diagram, according to an embodiment.

FIG. 6 is a sequence diagram for a method 600 for credential delivery performed by access management system 100, according to an embodiment. The steps of FIG. 6 may be performed by processor(s) 210 of a computing device 102 at one or more of credential generator 120, user device 150, central server 170, and key server 180.

Steps are provided for illustrative purposes. Variations of the steps, omission or substitution of various steps, or additional steps may be considered. It should be understood that one or more of the steps may be performed in a different sequence or in an interleaved or iterative manner At step 6.1, a user, such as an employee as shown by way of example in FIG. 6, visits a universal resource locator ("URL") for a resource 103 using a browser such as browser 152.

At step 6.1.1, the URL is auto-detected by credential provisioner 140, illustrated by way of example in FIG. 6 as "Alfred (Plugin)".

At step 6.1.1.1, credential provisioner 140 requests encrypted credentials 101 from access interface 172, illustrated by way of example as "Access Group Server" in FIG. 6, at central server 170.

At step 6.1.1.2, credential provisioner 140 receives encrypted credentials 101 from access interface 172.

At step 6.1.1.3, credential provisioner 140 sends the encrypted credentials 101 to encryption daemon 154.

At step 6.1.1.3.1, encryption daemon 154 requests a certificate, containing a public key, from key server 180, illustrated by way of example as "Entrust Certificate Store" in FIG. 6.

At step 6.1.1.3.2., encryption daemon 154 receives the certificate from key server 180 with the public key.

At step 6.1.1.3.3, encryption daemon 154 decrypts the encrypted credentials using the private key that corresponds to or is linked to the public key, from private key store 156.

At step 6.1.1.3.4, decrypted credentials 101 are sent from encryption daemon 154 to credential provisioner 140.

At step 6.1.1.4, credential provisioner 140 injects credentials 101 into a web form for the URL for resource 103.

At step 6.1.1.5, the user (for example, an employee) can then log in and access resource 103 at the URL.

Figure 7:
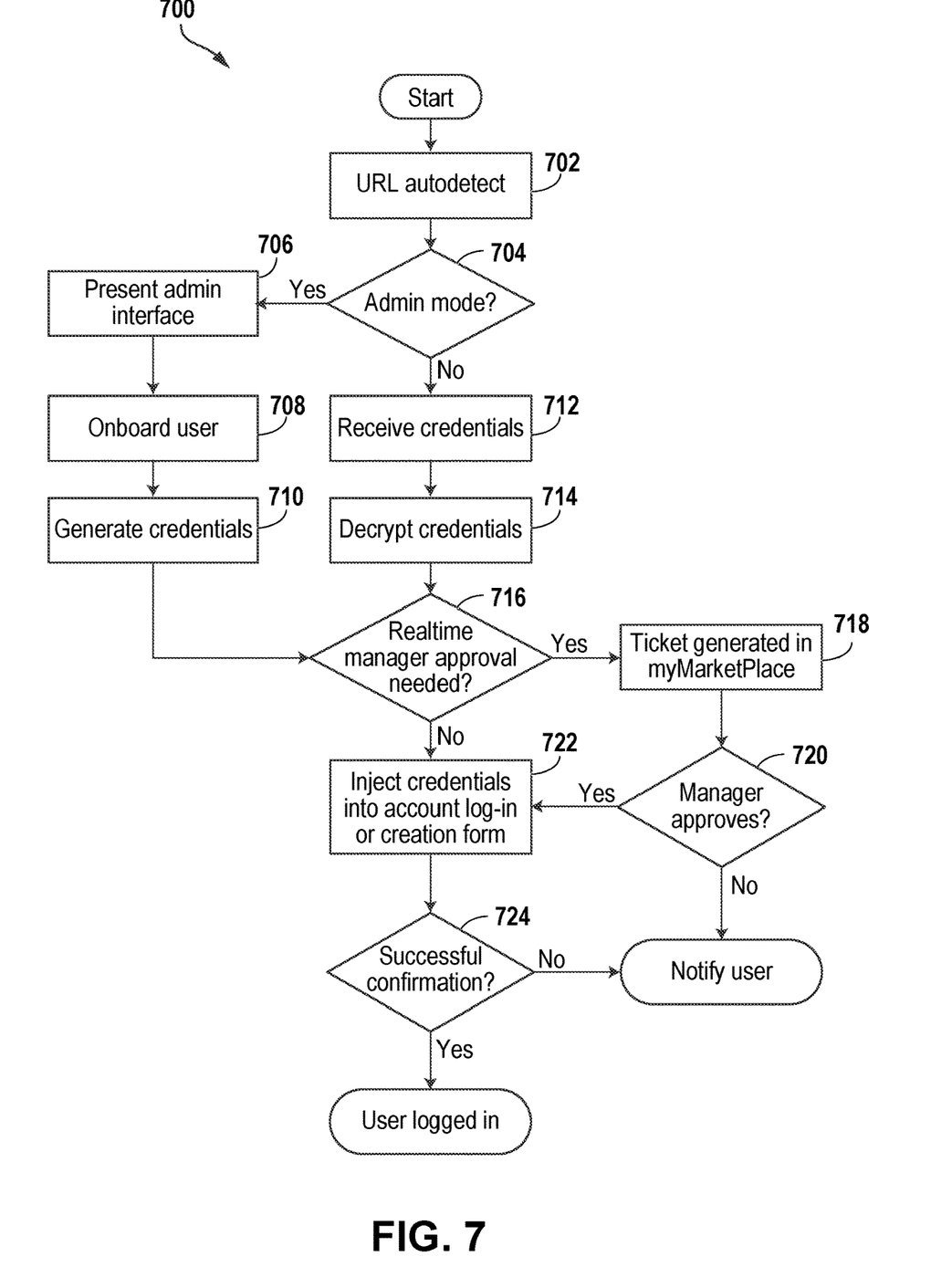
FIG. 7 is flow chart of a method for delivering credentials, according to an embodiment.

FIG. 7 is a flow chart of a method 700 for provisioning credentials, in an example using access management system 100, according to an embodiment. Steps, shown as blocks in FIG. 7, are provided for illustrative purposes. Variations of the blocks, omission or substitution of various blocks, or additional blocks may be considered. It should be understood that one or more of the blocks may be performed in a different sequence or in an interleaved or iterative manner.

Method 700, in particular, one or more of blocks 702 to 724, may be performed by software and/or hardware of a computing device such as computing device 102, in an example at credential provisioner 140.

At block 702, a URL for a resource 103, accessed using a browser such as browser 152, is automatically detected by credential provisioner 140.

At block 704, credential provisioner 140 evaluates whether an administrator mode is activated. If the administrator mode is activated, control flow proceeds to block 706. If administrator mode is not activated, control flow proceeds to block 712.

FIG. 7 depicts one particular scenario where an administrator may be required to perform a manual step in order to start the generation of credentials 101—such as if required by an enterprise policy. As such, generation of credentials 101 may depend on being in "admin mode" at block 704. An enterprise policy may dictate whether this step is required, or generation of credentials 101 would be based on other criteria such as whether the resource is one requiring credentials, whether or not credentials have been previously generated, or other suitable criteria.

At block 706, credential provisioner 140 presents an administrator interface.

At block 708, a user is onboarded by completing any steps required by an enterprise policy, creating a database record for the user and the initiation of credentials generation for them, for the particular resource 103.

At block 710, credential provisioner 140 generates credentials 101, as disclosed herein.

At block 712, credentials 101 have been previously generated, and encrypted credentials 101 are received by credential provisioner 140.

At block 714, encrypted credentials 101 are decrypted, as disclosed herein.

At block 716, credential provisioner 140 evaluates whether real-time or near real-time manager approval is needed for use of credentials 101. If approval is needed, control flow proceeds to block 718. If approval is not needed, control flow proceeds to block 722.

At block 718, credential provisioner 140 generates a push notification to a manager for real-time or near real-time manager approval.

At block 720, credential provisioner 140 evaluates whether an approval is received of the manager approval. If approval is not received, the user is notified. If approval is received, control flow proceeds to block 722.

At block 722, credential provisioner 140 injects credentials 101 into an account log-in or creation form for resource 103. Depending on the type of request received at block 722, credentials 101 may be injected to login to resource 103, or to create an account with resource 103, simulating user input. The code or logic for injection may determine what template (e.g., which fields to fill in a web form) to use for credentials injection based on the type of request (creation or use).

At block 724, credential provisioner 140 evaluates whether a confirmation is received from resource 103. If a confirmation is not received, the user is notified. If a confirmation is received, the user is logged in and notified.

Figure 8:
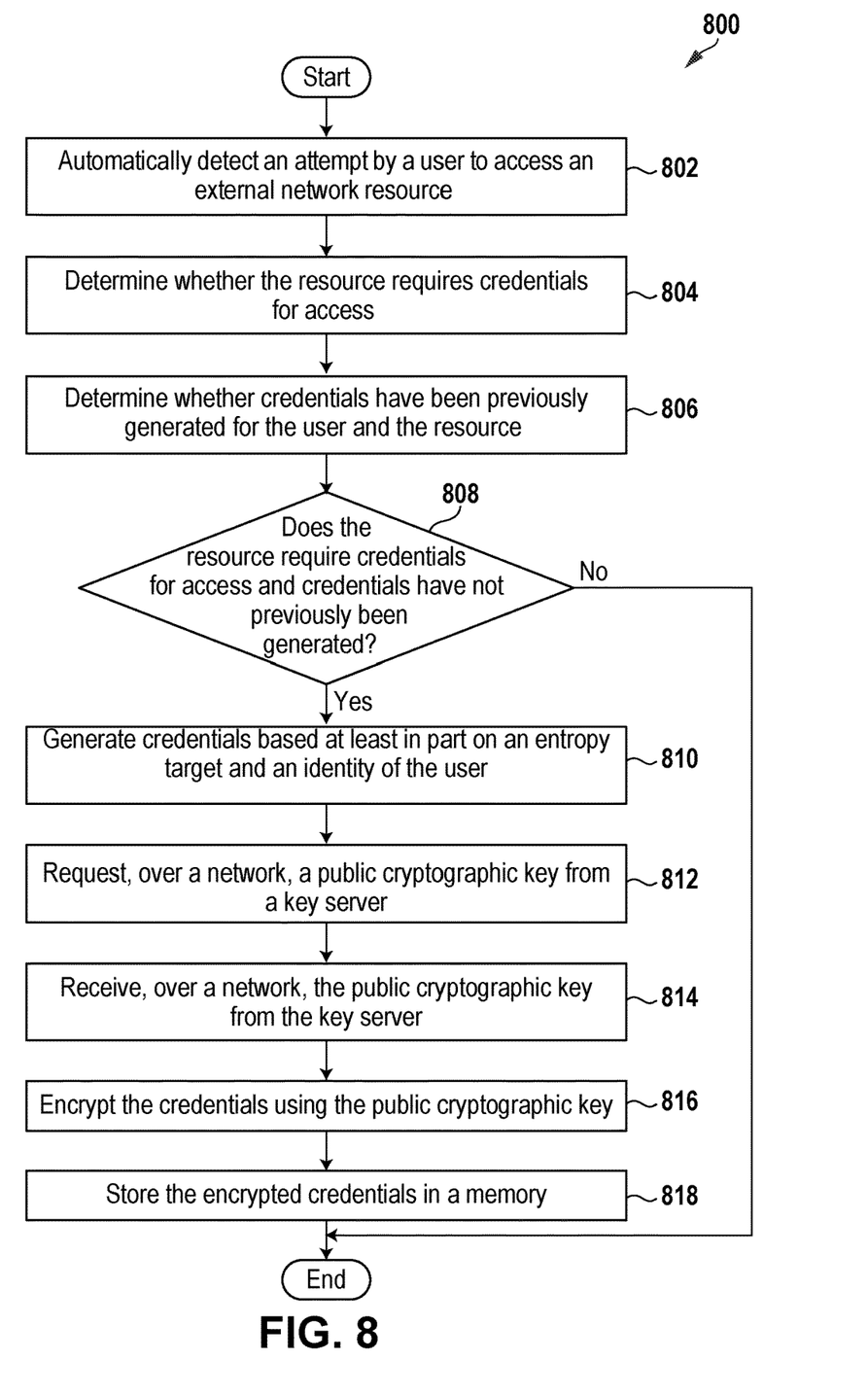
FIG. 8 is a flow chart of a method for provisioning credentials, according to an embodiment.

FIG. 8 is a flow chart of a method 800 for provisioning (generating and delivering) credentials, according to an embodiment. Steps, shown as blocks in FIG. 8, are provided for illustrative purposes. Variations of the blocks, omission or substitution of various blocks, or additional blocks may be considered. It should be understood that one or more of the blocks may be performed in a different sequence or in an interleaved or iterative manner.

Method 800, in particular, one or more of blocks 802 to 818, may be performed by software and/or hardware of a computing device such as computing device 102, in an example, one or more components of access management system 100 such as credential generator 120 and credential provisioner 140.

At block 802, credential provisioner 140 automatically detects an attempt by a user to access an external network resource, such as resource 103.

In some embodiments, automatically detecting the attempt comprises automatically detecting a universal resource locator (URL) of resource 103.

At block 804, credential provisioner 140 determines whether resource 103 requires credentials, such as credentials 101, for access.

In some embodiments, determining whether resource 103 requires credentials 101 for access comprises determining whether resource 103 is identified in a data store or a catalogue such as catalogue 130.

At block 806, credential provisioner 140 determines whether credentials 101 have been previously generated for the user and resource 103.

In some embodiments, determining whether credentials 101 have been previously generated for the user and resource 103 comprises determining whether credentials 101 for the user and the resource are present in a database such as database 160.

At block 808, credential provisioner 140 evaluates whether resource 103 requires credentials 101 for access and whether credentials 101 have not previously been generated. If resource 103 requires credentials 101 for access and credentials 101 have not previously been generated, control flow continues to block 810. If not, control terminates.

At block 810, credential generator 120 generates credentials 101 based at least in part on an entropy target and an identity of the user.

In some embodiments, credential generator 120 requests real-time approval before generating credentials 101 or credential provisioner 140 requests real-time approval before instructing credential generator 120 to generate credentials 101.

In some embodiments, credentials 101 are generated based at least in part on a cryptographically secure random number generator.

In some embodiments, credentials 101 are generated based at least in part on user input from the user.

In some embodiments, credentials 101 are generated based at least in part on user input from an administrator.

At block 812, credential provisioner 140 requests, over a network, a public cryptographic key from a key server such as key server 180.

At block 814, credential provisioner 140 receives, over the network, the public cryptographic key from key server 180.

At block 816, credential provisioner 140 encrypts credentials 101 using the public cryptographic key.

At block 818, credential provisioner 140 stores the encrypted credentials 101 in a memory, such as database 160.

In some embodiments, for delivery of credentials 101, credential provisioner 140 requests and receives the public cryptographic key from key server 180, identifies a private cryptographic key corresponding to the public cryptographic key, decrypts the encrypted credentials 101 using the private cryptographic key, and inserts or injects the decrypted credentials 101 in a web form to access resource 103.

In some embodiments, credential provisioner 140 masks the decrypted credentials 101 before inserting the decrypted credentials 101 to access resource 103.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for provisioning credentials, the method comprising:
    automatically detecting an attempt by a user to access an external network resource; determining whether the resource requires credentials for access;
    determining whether credentials have been previously generated for the user and the resource; and
    when the resource requires credentials for access and credentials have not previously been generated:
    receiving a mandated entropy target having a target complexity;
    generating, by a cryptographically secure random or pseudorandom number generator, credentials based at least in part on an identity of the user and the entropy target, wherein the entropy target is used by the cryptographically secure random or pseudorandom number generator to generate a sequence of bits in the credentials based on the target complexity, wherein the user is unaware of the credentials;
    requesting, over a network, a public cryptographic key from a key server;
    receiving, over the network, the public cryptographic key from the key server;
    encrypting the credentials using the public cryptographic key; and
    storing the encrypted credentials in a memory.

2. The computer-implemented method of claim 1, further comprising:
    identifying a private cryptographic key corresponding to the public cryptographic key;
    decrypting the encrypted credentials using the private cryptographic key; and inserting the decrypted credentials in a web form to access the resource.

3. The computer-implemented method of claim 2, further comprising masking the decrypted credentials before the inserting the decrypted credentials.

4. The computer-implemented method of claim 1, further comprising:
    requesting real-time approval before generating the credentials.

5. The computer-implemented method of claim 1, wherein the automatically detecting the attempt comprises automatically detecting a universal resource locator (URL) of the resource.

6. The computer-implemented method of claim 1, wherein the determining whether the resource requires credentials for access comprises determining whether the resource is identified in a catalogue.

7. The computer-implemented method of claim 1, wherein the determining whether credentials have been previously generated for the user and the resource comprises determining whether credentials for the user and the resource are present in a database.

8. The computer-implemented method of claim 1, wherein the credentials are generated based at least in part on user input from the user.

9. The computer-implemented method of claim 1, wherein the credentials are generated based at least in part on user input from an administrator.

10. The computer-implemented method of claim 9, wherein the user input comprises data representing a mouse movement used as an additional entropy source for generation of the credentials by the cryptographically secure random or pseudorandom number generator.

11. A computer system comprising: a processor; a memory in communication with the processor, the memory storing instructions that, when executed by the processor cause the processor to:
    automatically detect an attempt by a user to access an external network resource;
    determine whether the resource requires credentials for access;
    determine whether credentials have been previously generated for the user and the resource; and
    when the resource requires credentials for access and credentials have not previously been generated:
    receive a mandated entropy target having a target complexity;
    generate, by a cryptographically secure random or pseudorandom number generator, credentials based at least in part on an identity of the user and the entropy target, wherein the entropy target is used by the cryptographically secure random or pseudorandom number generator to generate a sequence of bits in the credentials based on the target complexity, wherein the user is unaware of the credential;
    request, over a network, a public cryptographic key from a key server;
    receive, over the network, the public cryptographic key from the key server;
    encrypt the credentials using the public cryptographic key; and
    store the encrypted credentials in the memory.

12. The system of claim 11, wherein the memory further stores instructions that, when executed by the processor cause the processor to: identify a private cryptographic key corresponding to the public cryptographic key; decrypt the encrypted credentials using the private cryptographic key; and insert the decrypted credentials in a web form to access the resource.

13. The system of claim 12, wherein the memory further stores instructions that, when executed by the processor cause the processor to: mask the decrypted credentials before the inserting the decrypted credentials.

14. The system of claim 11, wherein the memory further stores instructions that, when executed by the processor cause the processor to: request real-time approval before generating the credentials.

15. The system of claim 11, wherein the attempt is automatically detected by automatically detecting a universal resource locator (URL) of the resource.

16. The system of claim 11, wherein the resource is determined as requiring credentials for access by determining whether the resource is identified in a catalogue.

17. The system of claim 11, wherein the credentials are determined as having been previously generated for the user and the resource by determining whether credentials for the user and the resource are present in a database.

18. The system of claim 11, wherein the credentials are generated based at least in part on user input from the user, wherein the user input comprises data representing a mouse movement used as an additional entropy source for generation of the credentials by the cryptographically secure random or pseudorandom number generator.

19. The system of claim 11, wherein the credentials are generated based at least in part on user input from the user.

20. A non-transitory computer readable medium comprising a computer readable memory, the memory storing computer executable instructions thereon that when executed by a computer, cause the computer to:
   automatically detect an attempt by a user to access an external network resource;
   determine whether the resource requires credentials for access;
   determine whether credentials have been previously generated for the user and the resource; and
   when the resource requires credentials for access and credentials have not previously been generated:
   receive a mandated entropy target having a target complexity;
   generate, by a cryptographically secure random or pseudorandom number generator, credentials based at least in part on an identity of the user and the entropy target, wherein the entropy target is used by the cryptographically secure random or pseudorandom number generator to generate a sequence of bits in the credentials based on the target complexity, wherein the user is unaware of the credential;
   request, over a network, a public cryptographic key from a key server;
   receive, over the network, the public cryptographic key from the key server;
   encrypt the credentials using the public cryptographic key; and
   store the encrypted credentials in the memory.

* * * * *